United States Patent
Ulichney et al.

(10) Patent No.: US 6,921,172 B2
(45) Date of Patent: Jul. 26, 2005

(54) SYSTEM AND METHOD FOR INCREASING PROJECTOR AMPLITUDE RESOLUTION AND CORRECTING LUMINANCE NON-UNIFORMITY

(75) Inventors: Robert A. Ulichney, Stow, MA (US); Himanshu Arora, Champaign, IL (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/612,309

(22) Filed: Jul. 2, 2003

(65) Prior Publication Data

US 2005/0001991 A1 Jan. 6, 2005

(51) Int. Cl.[7] .................. G03B 21/00; G03B 21/14; H04N 5/64; G09G 35/02; G06K 9/40
(52) U.S. Cl. .................. 353/69; 353/121; 353/122; 348/744; 345/698; 345/596; 358/3.13; 382/275
(58) Field of Search ............... 353/69, 121–122; 348/744–747; 345/698, 596; 358/3.13; 382/275

(56) References Cited

U.S. PATENT DOCUMENTS

| | | | | |
|---|---|---|---|---|
| 5,495,346 A | * | 2/1996 | Choi et al. .................. 358/3.13 |
| 5,535,020 A | * | 7/1996 | Ulichney .................... 358/3.13 |
| 5,980,044 A | * | 11/1999 | Cannon et al. ............... 353/30 |
| 6,185,334 B1 | * | 2/2001 | Cheung et al. ............. 382/199 |
| 6,222,945 B1 | * | 4/2001 | Cheung et al. ............. 382/260 |
| 6,330,368 B1 | * | 12/2001 | Ulichney .................... 382/251 |
| 6,347,160 B1 | * | 2/2002 | Cheung et al. ............. 382/260 |
| 6,473,525 B1 | * | 10/2002 | Cheung et al. ............. 382/199 |
| 6,690,389 B2 | * | 2/2004 | Ulichney .................... 345/691 |
| 2001/0045957 A1 | * | 11/2001 | Ulichney .................... 345/596 |

* cited by examiner

*Primary Examiner*—Rodney Fuller
*Assistant Examiner*—Magda Cruz

(57) ABSTRACT

A system and method corrects luminance non-uniformity and increases the apparent amplitude resolution of an image generated by a projector. The projector, which has a given number of stated levels, receives input data and projects images based on that input data. To correct luminance non-uniformity, a projector correction look-up table (LUT) is created. The LUT attenuates the displayed image such that the whole image has the same luminance as the dimmest point. Input data received by the projector is modified by correction information containing in the LUT. The projector output is analyzed to identified the number of unique levels that the projector is capable of producing, which may be less than the number of stated levels. A dithering engine modify the corrected image data to increase the projector's amplitude resolution, creating the illusion of the projector having more than the limited number of unique levels identified.

14 Claims, 11 Drawing Sheets

SYSTEM AND METHOD FOR INCREASING PROJECTOR AMPLITUDE RESOLUTION AND CORRECTING LUMINANCE NON-UNIFORMITY

BACKGROUND OF THE INVENTION

1. Field of the Invention

The present invention relates to electronic imaging systems and, more specifically, to correcting projected or displayed images.

2. Background Information

Currently, there are a wide-variety of digital image projectors commercially available. Most digital projectors include a video decoder and a light engine. The video decoder converts video data received by the projector, e.g., from the display connection of a personal computer (PC), into pixel and color data. The pixel and color data is then supplied to the light engine, which converts that data into the actual projected image. The light engine includes a lamp, optics and logic for manipulating the light in order to generate the pixels and color.

There are three different types of technologies utilized by the light engines of today's projectors: Liquid Crystal Display (LCD), Digital Light Processing (DLP) and Liquid Crystal on Silicon (LCOS). An LCD light engine breaks down the light from a lamp into red, green and blue components. Each color is then polarized and sent to one or more liquid crystal panels that turn the pixels on and off, depending on the image being produced. An optic system then recombines the three color signals and projects the final image to a screen or other surface.

DLP technology was developed by Texas Instruments, Inc. of Dallas, Tex. A DLP light engine directs white light from a lamp onto a color wheel producing red, green, blue and white light. The colored light is then passed to a Digital Micromirror Device (DMD), which is an array of miniature mirrors capable of tilting back-and-forth on a hinge. Each mirror corresponds to a pixel of the projected image. To turn a pixel on, the respective mirror reflects the light into the engine's optics. To turn a pixel off, the mirror reflects the light away from the optics.

A LCOS light engine combines LCD panels with a low cost silicon backplane to obtain resolutions that are typically higher than LCD or DLP projectors. The LCOS light engine has a lamp whose light is sent to a prism, polarized, and then sent to a LCOS chip.

The LCOS chip reflects the light into the engine's optics where the color signals are recombined to form the projected image.

The quality of a projected image is a function of several characteristics, including brightness, also referred to as luminance. Due to the design of the optics within the light engines and/or the lamps themselves, most projectors do not project at a constant luminance level across the entire screen. FIG. 1 is a highly schematic illustration of the luminance levels measured in foot-lamberts of a displayed image 100 that was generated by a projector set to display all pixels at a constant luminance or brightness level. The displayed image 100 has a generally rectangular shape comprising a top edge 102, a right side edge 104, a bottom edge 106 and a left side edge 108. Rather than having a constant luminance throughout, the image 100 has a brightest region 110, which is at approximately 34.0 foot-lamberts, and several regions of decreasing luminance, terminating at a darkest region 112 at the image's upper left corner, which is at approximately 17.8 foot-lamberts. This non-uniformity in luminance detracts from the displayed image.

The luminance non-uniformity of a projector can become more pronounced under certain conditions. For example, when a "composite" image is created by multiple projectors whose individual images are tiled together, e.g., in a 4 by 5 pattern, to form the composite image, the non-uniformity in luminance is often much more apparent. Luminance non-uniformities can also be created (or existing non-uniformities made more pronounced) when the projector is set up at an angle to the display screen or surface. That portion of the displayed image that is closer to the projector will typically be brighter, while those portions located further away will be dimmer.

In addition, some projectors cause unnatural artifacts to appear in projected images. For example, if an input image has a series of regions that vary slowly in luminance, false contours or "bands" that are not present in the input image may nonetheless appear in the projected image. FIG. 2 illustrates an input image 200 whose luminance varies smoothly and gradually from a darkest region 202 near a lower left corner 204 to a lightest region 206 near an upper left corner 208. FIG. 3 illustrates a projected image 300 generated from input image 200 (FIG. 2). Rather than show an image whose luminance varies smoothly, projected image 300 has a plurality of discrete bands or false contours, including a darkest band 302, a lightest band 304, and a plurality of intermediary bands 306a–i. The appearance of such false contours, which is also referred to as "banding", occurs when the projector lacks sufficient luminance levels to adequately represent the input image 200. The appearance of false contours can substantially detract from the quality of the projected image.

Accordingly, a need exists for a projector whose displayed image(s) is uniform in luminosity, and eliminates or at least reduces the occurrence of false contours and other spurious artifacts.

SUMMARY OF THE INVENTION

Briefly, the present invention recites a system and method for correcting the luminance non-uniformity and increasing the apparent amplitude resolution an image generated by a projector. The projector, which has a given number of stated levels, receives input data and projects images based on that input data. To correct luminance non-uniformity, a projector correction look-up table (LUT) is created. The LUT attenuates the displayed image such that the whole image has the same luminance as the dimmest point. Input data received by the projector is modified by the correction information contained in the LUT. In addition, the output of the projector is analyzed to identify the number of unique levels that the projector is capable of producing, which may be less than the number of stated levels. A dithering engine is utilized to further modify the corrected image data to increase the projector's apparent amplitude resolution, thereby creating the illusion that the projector has more than its unique number of levels.

In particular, a camera is preferably employed to record the luminance non-uniformity of the projector at each of the projector's stated levels. The images captured by the camera are preferably corrected for camera non-uniformities, and organized into an array. The array is processed to identify and prune redundant planes, thereby revealing the unique number of levels supported by the projector. Each unique camera capture plane is examined, and the location, e.g., in x, y coordinates, of the dimmest captured value is identified. This same location in the projector correction LUT is then assigned the input level of the subject camera capture plane. The values of the remaining locations of the LUT are found by searching down the respective columns of the 3-D camera capture array for the plane whose level matches the dimmest captured value for the plane currently being evaluated. A suitable interpolation scheme may be used to enlarge the LUT from the resolution of the camera to the resolution of the projector.

To improve performance, the LUT may be converted into a one-dimensional (1-D) gain table, that specifies a gain for each projector output level, and a two-dimensional (2-D) spatial attenuation array. The level generated by the 1-D gain table and the 2-D spatial attenuation array is then provided as an input to the dithering engine. The dithering engine converts the input level to an output level based on the specified dither template. The output level is then converted to a unique projector level and utilized in generating the projected image.

BRIEF DESCRIPTION OF THE DRAWINGS

The invention description below refers to the accompanying drawings, of which.

DETAILED DESCRIPTION OF AN ILLUSTRATIVE EMBODIMENT

Figure 4:
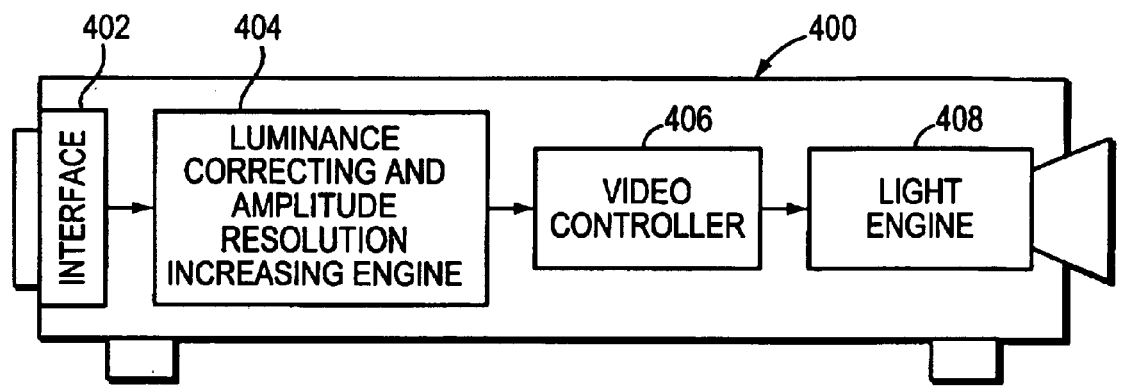
FIG. 4 is a highly schematic, partial block diagram of a digital projector in accordance with the present invention.

FIG. 4 is a highly schematic, partial block diagram of a digital projector 400 in accordance with the present invention. Projector 400 has an interface 402 for receiving input video data from a source, such as a personal computer (PC), a DVD player, etc. In accordance with the present invention, the projector 400 is configured to include a luminance correcting and amplitude resolution increasing (LCARI) engine 404 that receives the picture element (pixel) data from interface 402. As described herein, engine 404 modifies the received pixel data to correct for luminance non-uniformities and to increase the apparent resolution of the projector 400. Projector 400 further includes a video controller 406 that receives the "corrected" pixel data from engine 404, and performs some additional processing on that data, such as synchronization, linearization, etc. The pixel data is then sent to a light engine 408 for projecting an image to be displayed based on the pixel data received from the video controller 406.

The light engine 408 may use any suitable technology, such as one or more Liquid Crystal Display (LCD) panels, Digital Light Processing (DLP) or Liquid Crystal on Silicon (LCOS). Suitable digital projectors for use with the present invention include the HP (Compaq iPAQ) Model MP 4800 or the HP Digital Projector Model xb31 both from Hewlett Packard Co. of Palo Alto, Calif. Nonetheless, those skilled in the art will recognize that the present invention may be used with other projectors, including those using other types of image generation technologies.

It should be understood that pixel or image information may be in various formats. For example, with bi-tonal image information, there is only one component for representing the image, and that component has two shades. Typically, the shades are black and white although others may be used. With monochrome image information, there is one component used to define the luminance of the image. Monochrome images typically have black, white and intermediate shades of gray. Another format is color, which, in turn, can be divided into two subgroups. The first sub-group is luminance/chrominance in which the images have one component that defines luminance and two components that together define hue and saturation. The second sub-group is RGB. A color image in RGB format has a first component that defines the amount of red (R) in the image, a second component that defines the amount of green (G) in the image, and a third component that defines the amount of blue (B) in the image. Together these three color components define the luminance and chrominance of the image. For ease of description, the term "level" is used herein to refer to any such type of image systems or formats, i.e., bi-tonal, monochrome or color.

In accordance with the present invention, a digital video camera is preferably used to measure the projected display from projector 400. These camera measurements are then used to build a projector correction look-up table (LUT). The projector correction LUT is then utilized by the projector's LCARI engine 404 to modify the data ultimately used to drive the light engine 408, thereby correcting the non-uniformity. A dither engine modifies this corrected data to increase the number of apparent projector levels. Suitable video cameras for use with the present invention include the Hitachi DZ-MV 100A and the Sony DCR-VX2000, among others. That is, in a preferred embodiment, the camera utilized by the present invention is a low-cost, conventional digital video camera. Nonetheless, those skilled in the art will recognize that other cameras, including still digital cameras, may be used. Because the individual sensors of such cameras have imperfections and may not detect the same luminance level equally at all points, the camera is preferably subject to a correction process of its own before it is used to build the projector correction LUT.

Specifically, a camera attenuation array is generated for the camera. The camera attenuation array basically flattens the field of the camera correcting for the camera's non-uniform spatial response.

Generating the Camera Attenuation Array

Figure 5:
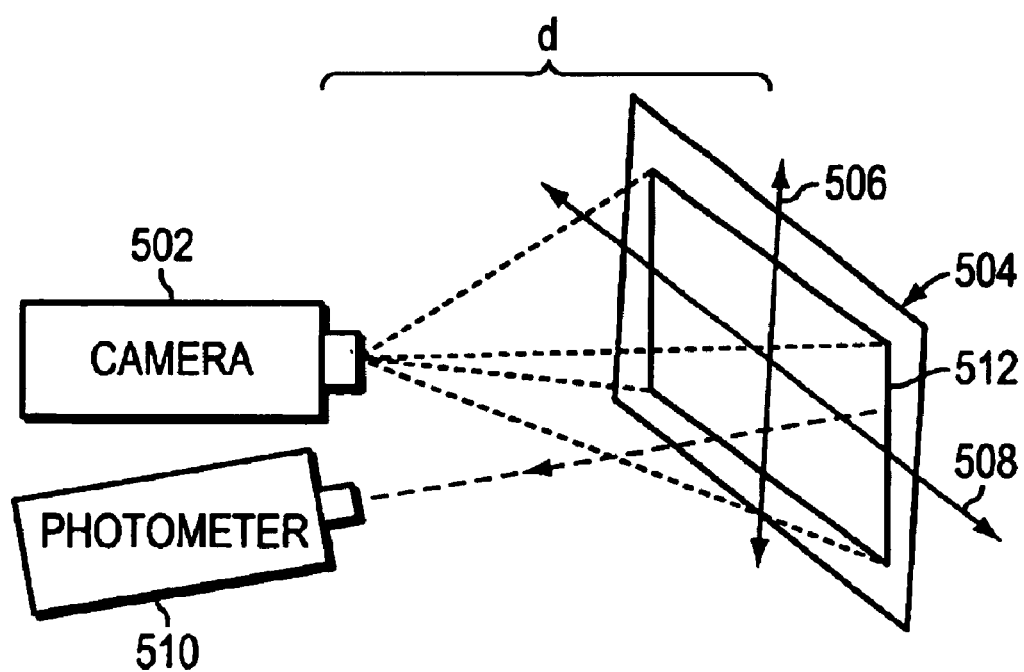
FIG. 5 is a highly schematic illustration of a preferred technique for creating a camera attenuation array.

FIG. 5 is a highly schematic illustration of a preferred technique for generating the attenuation array for a camera 502. To flatten the field of the camera 502, several images of a large white board 504 are preferably captured with the camera 502 under homogenous ambient illumination, e.g., in a room having an even distribution of light, such as in an office or laboratory having a plurality of fluorescent ceiling light fixtures. The white board, which may be a rectangular, foam core poster board, has a vertical axis and a horizontal axis as represented by arrows 506 and 508, respectively. The board 504 is preferably rotated about its two axes 506 and 508, which intersect at the center of the board, until it is determined to be uniformly illuminated across its entire surface. In the illustrative embodiment, a spot photometer 510 having a small angle is used to measure the luminance at different points across the board's surface. As mentioned above, the board 504 is rotated about axes 506 and 508 until the luminance measurements as detected by the spot photometer 510 are all equal.

A suitable means for measuring the luminance of board 504 is the Tektronix Model J16 Photometer with a Tektronix Model J6523 1-degree Narrow Angle Luminance Probe.

Once the board 504 is positioned so that it is uniformly illuminated, camera 502 is placed a focal length "d" from the board 304 and is operated to capture several images or frames of the board 504. The selected focal length "d" preferably results in the board 504 filling the entire image field of the camera 502, as illustrated by camera image field 512, which is smaller than board 504.

The data corresponding to the different images of board 504 as captured by camera 502 are then averaged, to reduce sampling noise, thereby producing a single array of averaged values. Camera 502 may have a resolution of 640 by 480, and may generate pixel values from 0–255, i.e., eight-bit values, where 0 corresponds to black (i.e., dimmest) and 255 corresponds to white (i.e., brightest). Accordingly, the array of averaged values computed for camera 502 will also be 640 by 480, and the values for each pixel will range from somewhere within 0–255, reflecting the non-uniformity of the camera 502.

The pixel having the lowest value in the array of averaged values, which corresponds to the dimmest pixel, is then located. Suppose the pixel values range from 130–210 with the 210 value(s) being at or near the center of the array. Every value in the array of averaged pixel values is then generated by the ratio (dimmest value)/(capture value), e.g., 130/210, 130/130, etc., so as to produce the camera attenuation array, which is 640 by 480. Given this ratio, the values of the camera attenuation array fall within the range of 0 to 1.0. As described herein, from this point on, all images captured by camera 502, including the images that will be taken of the projected displays produced by projector 400, are corrected using this camera attenuation array. Specifically, each captured pixel value from camera 502 is multiplied by that pixel's corresponding correction value, which ranges from 0 to 1.0, to produce a "corrected" pixel value. In this way, any two points that are "seen" by camera 502 with the same luminance will have the same corrected camera capture value.

Those skilled in the art will recognize that a computer, such as a Compaq D315 business PC or a HP workstation zx2000, both of which are commercially available from Hewlett Packard Co., may be used to receive the pixel data from the captured images produced by camera 502, to average those images and to produce the resulting camera attenuation array. More specifically, the computer, which has a memory and a processor, may include one or more software libraries containing program instructions for performing the steps of the present invention.

For ease of reference, the following table is provided that identifies the symbols that are used in this description.

| Symbol | Meaning |
| --- | --- |
| $N_g$ | Number of given or stated projector levels (typically 256) |
| $N_o$ | Number of unique output levels that the projector is actually capable of producing |
| $N_r$ | Number of raw input levels to the projector |
| $N_i$ | Number of input levels to the dither system |
| $N_t$ | Number of dither template levels |
| $n_g$ | An input level to the projector, where $n_g = \{0, 1, \ldots N_g-1\}$ |
| $n_o$ | A unique projector input level or output from the dither system, where $n_o = \{0, 1, \ldots N_o-1\}$ |
| $n_r$ | A raw input level, where $n_r = \{0, 1, \ldots N_r-1\}$ |
| $n_i$ | An input level to the dither system, where $n_i = \{0, 1, \ldots N_i-1\}$ |
| $n_t$ | A dither template value, where $n_t = \{0, 1, \ldots N_t-1\}$ |
| $c_g(x, y, n_g)$ | Camera Capture Array |
| $c_o(x, y, n_o)$ | Pruned Camera Capture Array |
| $p(x, y, n_o)$ | Projector Correction Look-up Table (LUT) |
| $[X_c, Y_c]$ | Number of x and y camera pixels (typically 640 by 480) |
| $(x_c, y_c)$ | Spatial address in terms of camera pixels |
| $[X_s, Y_s]$ | Number of x and y subsampled pixels (typical values are 16 by 12) |
| $(x_s, y_s)$ | Spatial address in terms of subsampled pixels |
| $[X_p, Y_p]$ | Number of x and y projector pixels (typically 1280 by 768) |
| $(x_p, y_p)$ | Spatial address in terms of projector pixels |
| $[X_d, Y_d]$ | Number of x and y elements in the dither array (typical values are 32 by 32) |
| $(x_d, y_d)$ | Spatial address in the dither array |
| $a_c(x_c, y_c)$ | Attenuation Array for the camera, where values range from 0 to 1.0 |
| $a_p(x_p, y_p)$ | Attenuation Array for the projector, where values range from 0 to 1.0 |
| $g(n_r)$ | Front-end (or gain) LUT |
| $B(n_o)$ | Back-end LUT, which maps a given level to an output level |
| $T(x_d, y_d)$ | Dither Template, where values are ordered from 0 to $N_t-1$ |
| $d(x_d, y_d)$ | Normalized Dither Array |

Camera Capture Array

Figure 6:
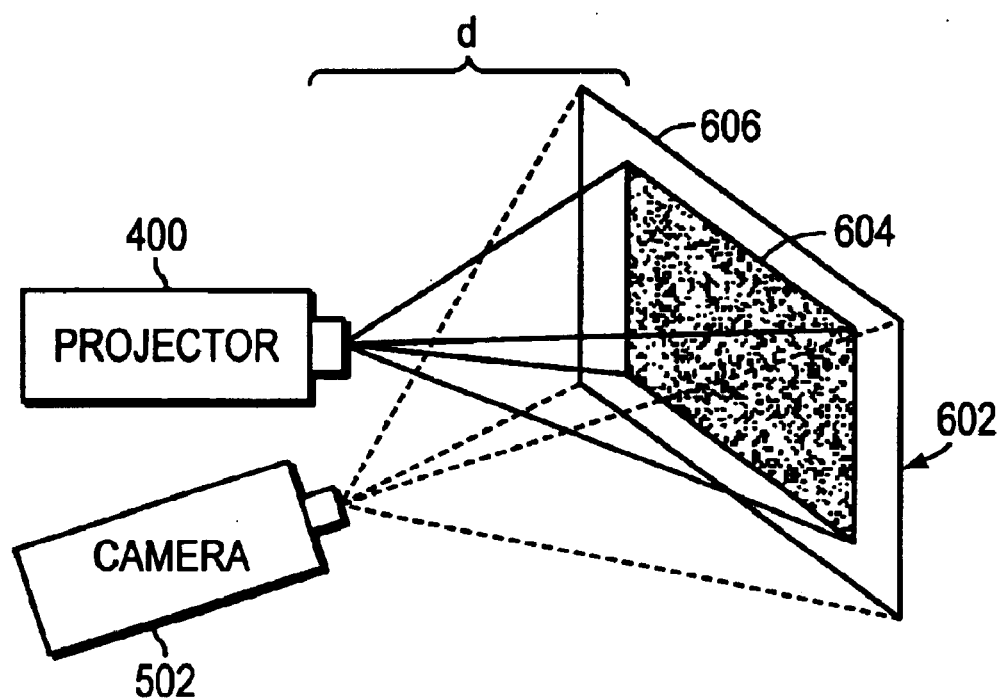
FIG. 6 is a highly schematic illustration of a preferred technique for creating a camera capture array.

After generating a camera attenuation array that corrects the image data captured by camera 502, the next step is to build a camera capture array. FIG. 6 illustrates the physical set-up for generating the camera capture array. In particular, the projector 400 is preferably set a distance "d" from a screen 402 where "d" is the same distance as in FIG. 5. The camera 502 is also placed distance "d" from the screen 602. Preferably, the projector 400 is set up perpendicular to the screen 602 such that a displayed image 604 as produced by projector 400 is a true rectangle. The camera 502 has a capture field 606 that is larger than the projected image 604 produced by the projector 400.

The projector 400 is then supplied video data via interface 402 (FIG. 4) that causes the projector 400 to sequentially display a series of projected images onto the screen 602 where all of the pixels for each individual image in the series is at the same input level, e.g., from 0 (black) to 255 (white). In other words, for a given projected image in the series, the input value, e.g., 125, supplied to the projector's light engine is the same for each pixel. The camera 502 captures each such projected image. Preferably, multiple images are captured by camera 502 for each input level displayed by projector 400, corrected with the camera attenuation array and averaged to reduce video noise. The resulting 256 arrays may then be logically stacked to form a three-dimensional (3-D) camera capture array where each data point is uniquely identified by the following tuple:

$$c_g(x_c, y_c, n_g)$$

where $x_c$ is the x-coordinate of a given pixel, e.g., 0–639,
$y_c$ is the y-coordinate of the given pixel, e.g., 0–479, and
$n_g$ is the input level to the projector, e.g., 0–255.

Figure 7:
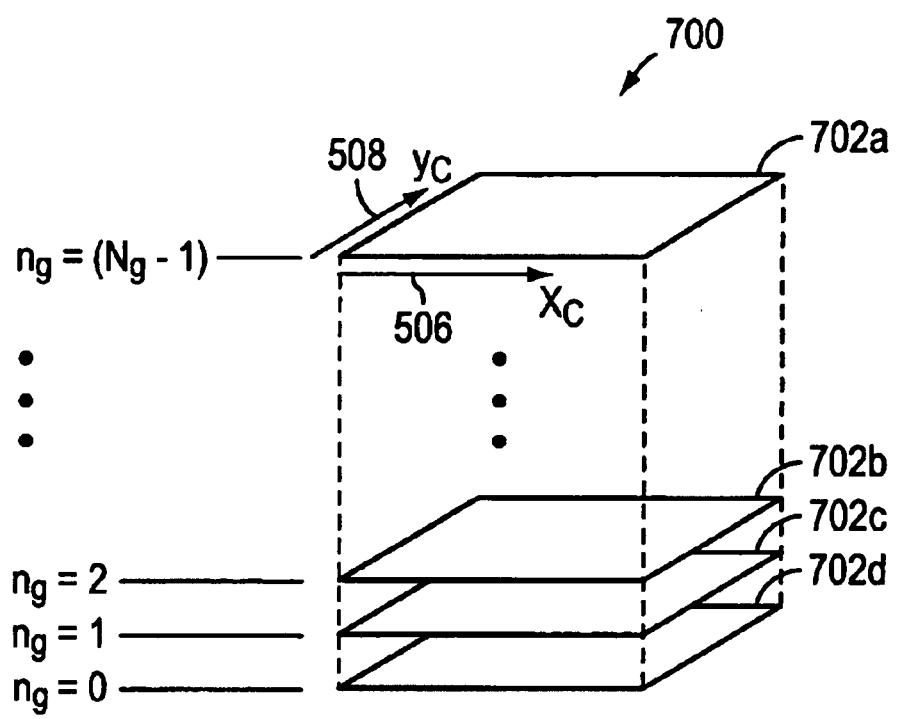
FIG. 7 is a highly schematic illustration of a plurality of camera capture planes logically organized as a three-dimensional array.

FIG. 7 is a highly schematic illustration of a 3-D camera capture array 700 formed by stacking a plurality of camera capture planes 702a–d, only some of which are shown, on top of each other such that the x,y coordinates of all planes 702 are aligned with one another. Each plane 702 corresponds to a respective input level, $n_g$, to the projector 400, where $n_g$ ranges from 0 to 255. As indicated above, all of the planes 702 lie within the same $x_c$ and $y_c$ coordinate system, as indicated by arrows 706 and 708.

It should be understood that the camera 502, unlike the projector 400, may not be perpendicular to the screen 602. In this case, the projected image captured by camera 502 may be a quadrilateral rather than a true rectangle. This quadrilateral is preferably transformed to a rectangle using conventional techniques. Specifically, the transformation or homography from quadrilateral to rectangle may be computed by finding four corresponding points in the two coordinate systems, i.e., the coordinate system of the rectangular image 604 displayed by the projector 400, and the coordinate system of the quadrilateral image 406 captured by the camera 302. Here, the four corners of the displayed rectangular image 604 and the four corners of captured quadrilateral as captured by the camera 502 may be used. A suitable transformation method is described in R. Sukthankar, C. Tat-Jen, G. Sukthankar, J. Rehg, D. Hsu, T. Leung "Self-calibrating camera-projector systems for interactive displays and presentations", *Computer Vision*, 2001, which is hereby incorporated by reference in its entirety.

Deriving the Number of Unique Projector Output Levels

Applicants have discovered that, although a projector may claim or state a particular number of luminance levels, $N_g$, in many cases, the projector is only capable of producing a number of unique output levels, $N_o$, that is less than the stated number. For example, for a projector, such as projector 400, that has a stated number of luminance levels of $N_g=256$, the number of unique levels that can actually be produced may be $N_o=131$. In the illustrative embodiment, the following method is used to determine the number of unique output levels, $N_o$, that the projector 400 is capable of producing. As described above, the camera capture array 700 comprises a plurality of planes 502, one for each stated output level, $N_g$, of the projector 400. Furthermore, the values contained within each plane 702 of the camera capture array 700 vary from a dimmest value to a brightest value. To compute the number of unique levels, $N_o$, the individual measured values from each plane 702 of the camera capture array 700 are averaged, thereby producing a single, averaged value for each stated level, $N_g$. Next, a plot of these averaged values versus stated output levels is, at least logically, created.

Figure 8:
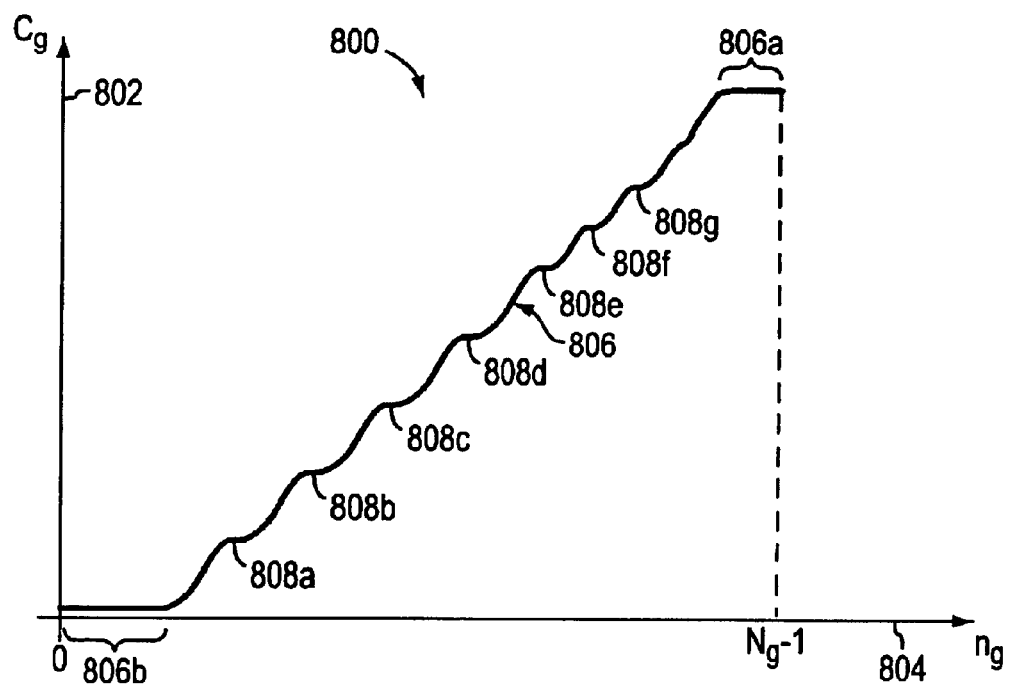
FIG. 8 is a highly schematic plot of measured camera values versus projector output levels.

FIG. 8 is a highly schematic illustration of a graph 800 showing the relationship of average measured camera values versus stated projector levels. In particular, graph 800 has a vertical axis 802 representing the average values from each plane 702 (FIG. 7) of the camera capture array 700, a horizontal axis 804 representing the projector's stated output levels, $n_g$, and a curve 806 formed by plotting each averaged value and its stated projector level. Examination of curve 806 reveals at least two types of redundancy. First, an upper portion 806a and a lower portion 806b of curve 806 appear clipped. That is, although the stated projector level is changing through these portions 806a, 806b, the averaged measured value remains the same. Second, throughout a middle portion 806c of curve 806, some of the adjacent points will have the same average measured value, as illustrated in areas 808a–g. For example, with some projectors, every third stated level has the same average measured value as the one adjacent to it. In sum, although projector 400 may have 256 stated levels, evaluation of curve 806 demonstrates that projector 400 can produce only a fewer number, e.g., 131, of unique output levels.

Utilizing the information from plot 800, the camera capture array 700 is pruned by removing all of the redundant planes 702 from the array. In the illustrative embodiment, two adjacent planes are considered to be unique, i.e., non-redundant, if $$c(n_g+1)-c(n_g)>t^*[c_{max}-c_{min}]$$

where, $c(n_g+1)$ is the average measured camera value for the first plane 702;

$c(n_g)$ is the average measured camera value for the next adjacent plane 702;

t is a predetermined threshold;

$c_{max}$ is the largest average measured camera value considering all of the planes 702; and $c_{min}$ is the smallest average measured camera value considering all of the planes 702.

A suitable value for t is 0.001, although other values may be used. Moreover, those skilled in the art will recognize that other algorithms or comparison techniques may be used to determine which planes 702 are unique.

Suppose, for example, that the above algorithm is applied to the first and second, second and third, and third and fourth planes 702, i.e. to the planes corresponding to stated levels 0–3. Suppose further that the results of this analysis show that these four planes are not unique. In this case, the redundant planes 702 corresponding to stated levels 0–2 are pruned, i.e., removed from the camera capture array 700. The pruned camera capture array may be referred to as $c_o(x_c, y_c, n_o)$, where $n_o$ is a unique level that the projector 400 is capable of producing. In addition, the mapping of stated projector level to unique level is recorded in a back-end look-up table, $B(n_o)$, as described below. For example, stated projector levels 0–3 would all map to unique level 3.

In the illustrative embodiment, to reduce computational complexity, the spatial dimensions, i.e., $x_c$ and $y_c$, of each plane from the pruned camera capture array is reduced by low-pass filtering and subsampling. A suitable subsample size is 16 by 12, resulting in a camera capture array stack having a size of 16×12×131, whose individual data elements may be uniquely identified or addressed by the following tuple:

$$c_o(x_s, y_s, n_o)$$

where, $x_s$ is the x-coordinate of a given pixel in sub-sampled space, e.g., 0–15, $y_s$ is the y-coordinate of the given pixel in sub-sampled space, e.g., 0–11, and $n_o$ is a unique input level, e.g., 0–130.

The low-pass filtering and subsampling may be performed as follows. The original grid of 640 by 480 is segmented into equal-sized and equi-spaced rectangular areas. The number of rectangular areas equals the low resolution subsample grid of 16 by 12 with a low resolution grid point in the center of each rectangle. The pixel values assigned to the new low-resolution grid are generated by a weighted average of the surrounding original pixel values. A suitable weighting function is a two-dimensional gaussian with a sigma of 0.3 times the output grid period (in terms of original grid pixels). The output or low-resolution grid period would be 40 in this example. Those skilled in the art will recognize that other averaging filters or techniques may be employed.

Generating the Projector Correction Look-Up Table (LUT)

Using the subsampled, pruned camera capture array, $c_o(x_s, y_s, n_o)$, a projector correction look-up table (LUT) is created having the same size as the subsampled, pruned camera capture array. The data elements of the projector correction LUT may be represented as follows:

$p(x_s, y_s, n_o)$

The method for creating the projector correction LUT is as follows. At each plane, $n_o$, in the pruned camera capture array, $c(x_s, y_s, n_o)$, the x and y location of the dimmest pixel is located, i.e., the pixel with the lowest value. This dimmest pixel value is assigned to a variable referred to as $\alpha$, and the pixel location of the projector correction LUT that corresponds to the pixel location that was found to have the dimmest pixel is assigned a value of $n_o$, which is the input level currently being evaluated. The other x,y locations of the projector correction LUT for the input level currently being evaluated are then computed. Specifically, these values are derived using reverse look-up (e.g., by searching down) the columns of the pruned 3-D camera capture array, i.e., down the current x,y location, for the plane whose $n_o$ value matches $\alpha$. This may best be explained with reference to an example.

Figure 9:
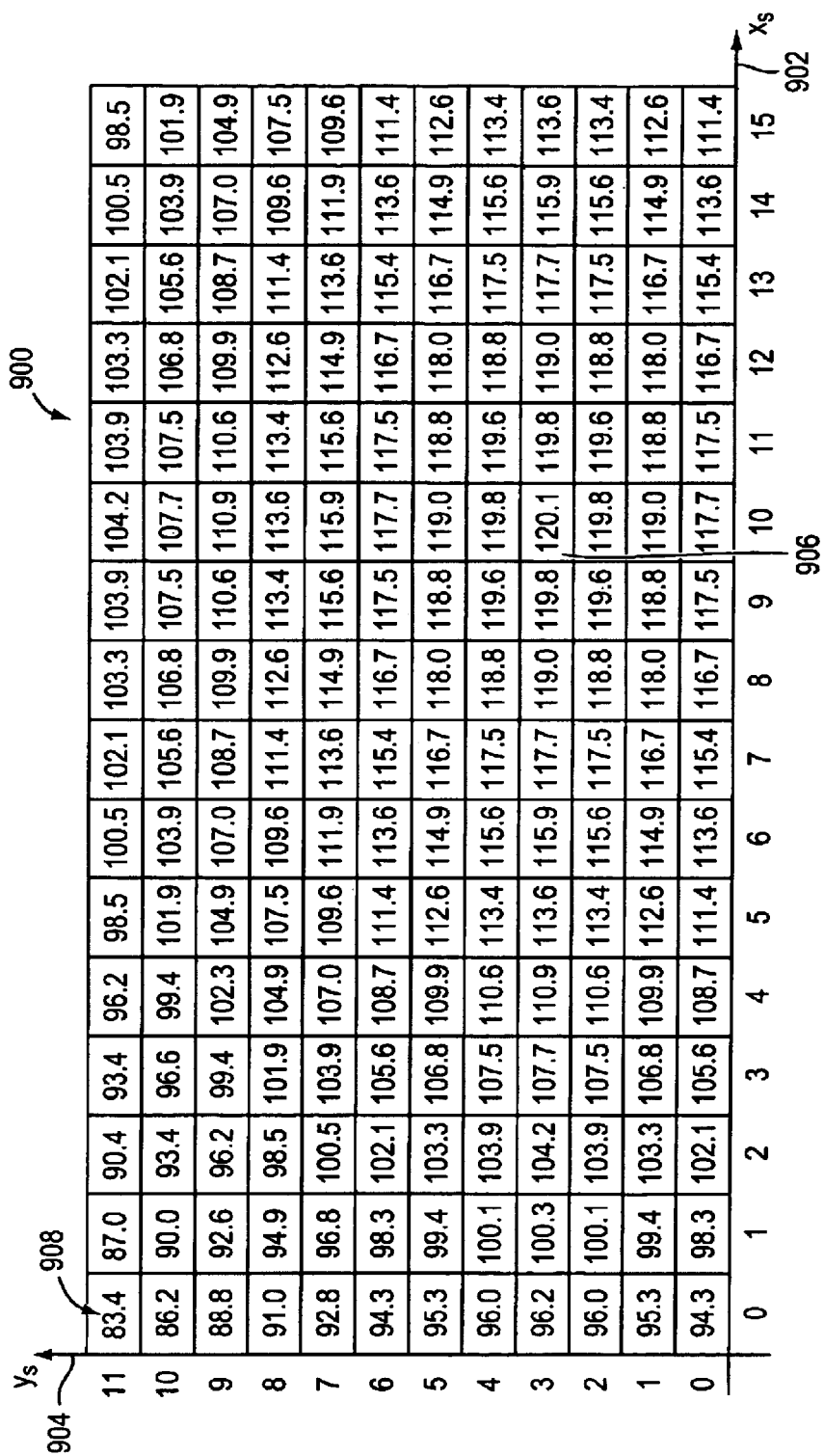
FIGS. 9, 10 and 12 are highly schematic illustrations of image planes.

FIG. 9 is a highly schematic illustration of a subsampled camera capture array 900 for a corresponding unique input level, e.g., 125. Plane 900 has an $x_s$-axis 902 that is horizontally aligned and a $y_s$-axis 904 that is vertically aligned. The x-coordinates range from 0–15, while the y-coordinates range from 0–11. The intersection of each pair of x,y coordinates defines a cell for storing information. Although plane 900 corresponds to an image produced by projector 400 in which all projector pixels were uniformly illuminated at an input level of 125, the values as captured by the camera 502 and corrected range from a highest, i.e., brightest, of 120.1 at location 906 having x,y coordinates of 10,3, to a lowest, i.e., dimmest of 83.7 at location 908 having x,y coordinates of 0,11. As mentioned above, one of the first steps of the present invention is to identify the lowest or dimmest value within each camera capture array. For camera capture plane 900, the dimmest captured value is 83.4, which happens to be at x,y coordinates 0,11. This value is preferably is assigned to the variable $\alpha$.

Figure 10:
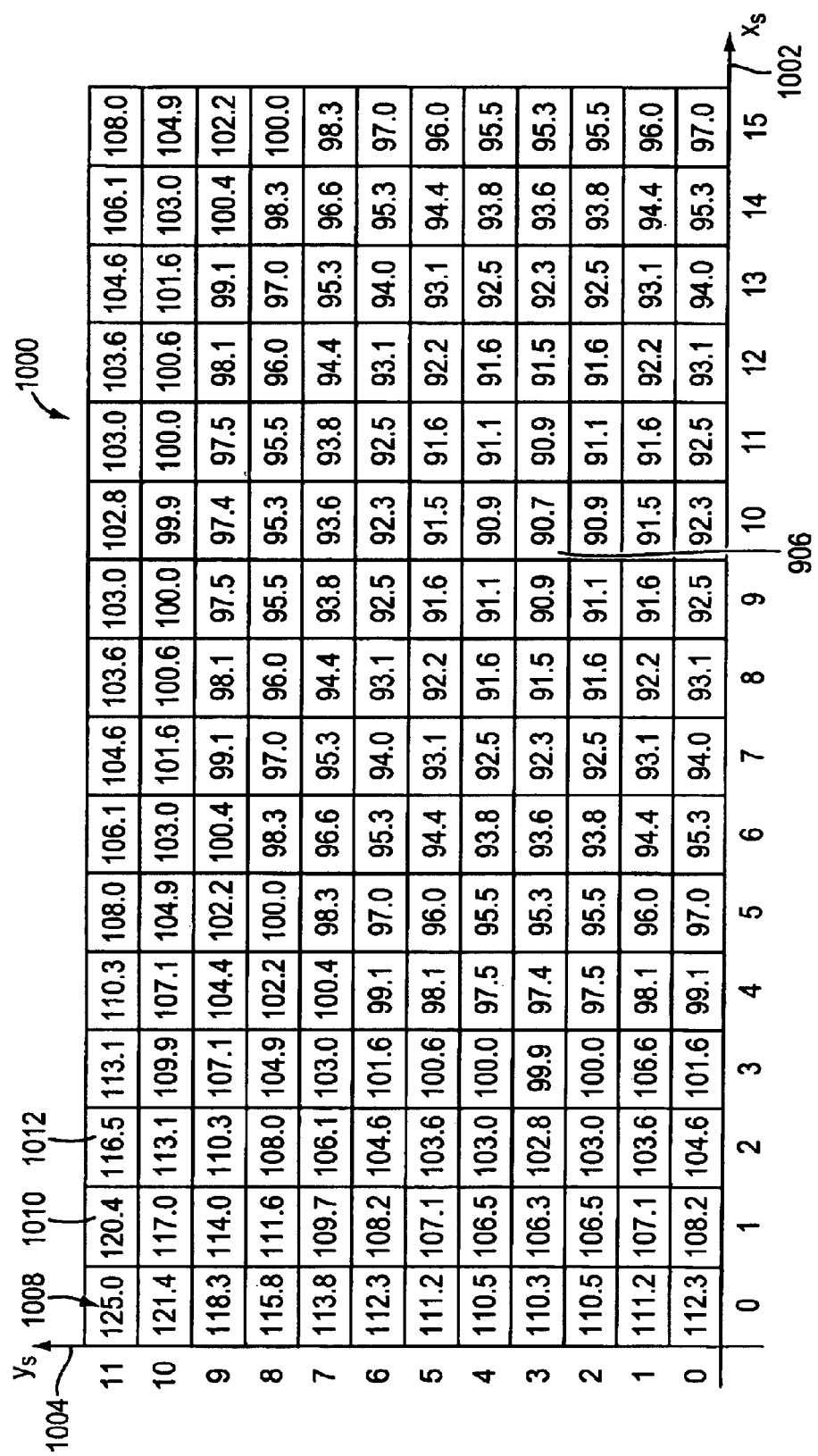

FIG. 10 is a highly schematic illustration of a subsampled projector correction plane 1000 for input level 125, as generated from the pruned 3-D camera capture array, including plane 900, which also corresponds to projector level 125. Correction plane 1000 similarly has an x-axis 1002 that is aligned with the horizontal axis, and a y-axis 1004 that is aligned with the vertical axis. The intersection of each pair of x,y coordinates defines a cell for storing information, i.e., "corrected" projector input levels. As indicated above, the dimmest value captured for projector input level 125 was 83.4 at cell 908 (FIG. 9) whose x,y coordinates are 0,11. A first step in building the projector correction plane for input level 125 is to set the matching cell of plane 1000, i.e., cell 1008 whose x,y coordinates are 0,11 to the value of the subject input level, i.e., to 125. Thus, as indicated in FIG. 10, cell 1008 is set to 125.0. The remaining cells of plane 1000 are then set with reference to the pruned 3-D camera capture array.

Specifically, suppose the next value of plane 1000 that is to be computed is at cell 1010, whose x,y coordinates are 1,11. The value from plane 900 corresponding to coordinates 1,11 is 87.0, and the value of $\alpha$ is 83.4. To derive the value to be assigned to cell 1010 of plane 1000, a reverse look-up is performed on the pruned 3-D camera capture array for all unique input levels to find the one plane at which the captured value at x,y location 1,11 is the same as $\alpha$, i.e., 83.4. Suppose the column of captured values within the pruned camera capture array at x,y coordinates 1,11 include the following:

| Camera Capture Array Values at x, y, location 1, 11 | Input Level |
|---|---|
| 84.3 | 122 |
| 83.7 | 121 |
| 83.2 | 120 |
| 82.7 | 119 |

Here, the value of $\alpha$, which is 83.4, falls between the camera capture plane for input level 120, whose captured value is 83.2, and the camera capture plane for input level 121, whose captured value is 83.7. Because the current value of $\alpha$ does not appear on one of the actual camera capture planes, a linear interpolation process is performed on the values from the two adjacent camera capture planes in order to find the matching, "corrected" input level for a captured value of 83.7 at x,y coordinates 1,11. In this case, the two adjacent planes correspond to input level 120 and input level 121. A linear interpolation process performed on these two adjacent planes for a capture value of 83.4 yields an input level of 120.4. Accordingly, cell 1010 of projector correction plane 1000 is set to 120.4, as illustrated in FIG. 10.

Suppose the next value of the projector correction plane 1000 to be computed is at cell 1012, whose x,y coordinates are 2,11. The captured value from camera capture plane 900 (FIG. 9) at x,y location 2,11 is 90.4, and the value of $\alpha$, for this particular array, is 83.4. Again, to find the value to be assigned to cell 1012 of projector correction plane 1000 at x,y coordinates 2,11, a reverse look-up is performed on the pruned 3-D array of camera capture planes for all unique levels to find the one plane (real or virtual) at which the value corresponding to x,y coordinates 2,11 is the same as $\alpha$, i.e., 83.4. In this case, suppose the value 83.4 falls between the planes whose input levels are 116 and 117, and that a linear interpolation process performed on the values from these two planes yields a correction value of 116.5 for x,y coordinates 2,11. This computed correction value, 116.5, is then loaded into cell 1012, as indicated in FIG. 10.

This process of computing the "corrected" input levels for each x,y location is repeated for all other locations within the projector correction plane 1000, thereby generating a fully populated plane 1000 for input level 125. This process is also repeated for each unique level. That is, the dimmest camera capture value of the subject camera capture plane is identified, and the correction value of the respective projector correction plane 1000 matching the location of the dimmest captured value is set to the input level being evaluated. The dimmest capture value is also assigned to the variable $\alpha$, and the remaining values of this new projector correction plane 1000 are derived using the reverse-lookup procedure described above.

The individual projector correction planes 1000 are then logically stacked on top of each other to form a projector correction look-up table (LUT) that is similar in appearance to the pruned 3-D camera capture array. To match the size of the subsampled projector correction planes 1000 that make up the LUT, which are 12 by 16, to the size of the projector display space, e.g., 768 by 1280, each such projector correction plane 1000 is enlarged. This may be achieved using a known interpolation scheme, such as bi-linear interpolation.

A suitable algorithm for performing bilinear interpolation is described in P. S. Heckbert (editor) Graphic Gems IV IBM (1994), which is hereby incorporated by reference in its entirety.

Each corrected input level within the resulting projector correction LUT may be given by:

$$p(x_p, y_p, n_o)$$

where, $x_p$ is the x-coordinate of a given pixel in projector space, e.g., 0–1279, $y_p$ is the y-coordinate of the given pixel in projector space, e.g., 0–767, and $n_o$ is the raw or uncorrected input level, e.g., 0–255.

In a first embodiment of the present invention, the luminance correcting and amplitude resolution increasing engine 404 is loaded with the plurality of projector correction planes 1000 forming the projector correction LUT. That is, engine 404 includes one more memory structures, such as a Dynamic Random Access Memory (DRAM) or a Synchronous Random Access Memory (SRAM), among others, that are loaded with the 3-D projector correction LUT. Pixel data, e.g., a pair of x,y coordinates, such as 7,2, and the matching raw or uncorrected input level, such as 125 is received at engine 404 from interface 402. Engine 404 uses the received information to perform a look-up on the projector correction LUT. Specifically, engine 404 uses the raw or uncorrected input level, i.e., 125, to identify the matching the projector correction plane 1000 within the LUT. Engine 404 then uses the specified x,y coordinates, i.e., 7,2, to locate the respective cell of this matching projector correction plane. Suppose the identified cell contains a value of 123. In response, engine 404 provides the video controller 406 with this "corrected" input level, i.e., 123, for the subject location, rather than the input level received by the projector 400 at interface 402, i.e., 125. The video controller 406 then performs its processing and passes the pixel data to the light engine 408. This correction process is repeated for all uncorrected input level/x,y coordinate pairs received at the interface 402, resulting in projected images generated by projector 400 being uniform in luminance across the entire displayed image.

Optimized Run-time System

For a projector 400 having a resolution of 768 by 1280 and 130 unique output levels, the projector correction LUT will have 768×1280×130 or $1.3 \times 10^8$ different correction values. Assuming each correction value is 8-bits, the LUT will require a memory resource capable of storing on the order of several hundred Megabytes (Mbytes) of data.

In addition, a separate look-up will have to be performed on this table for every uncorrected input level/x,y pair received at projector 400. Such an arrangement, although capable of generating a uniform projected display, nonetheless demands significant memory and processor resources. Those skilled in the art will recognize that optimizations for reducing the memory/processor requirements are possible.

Figure 1:
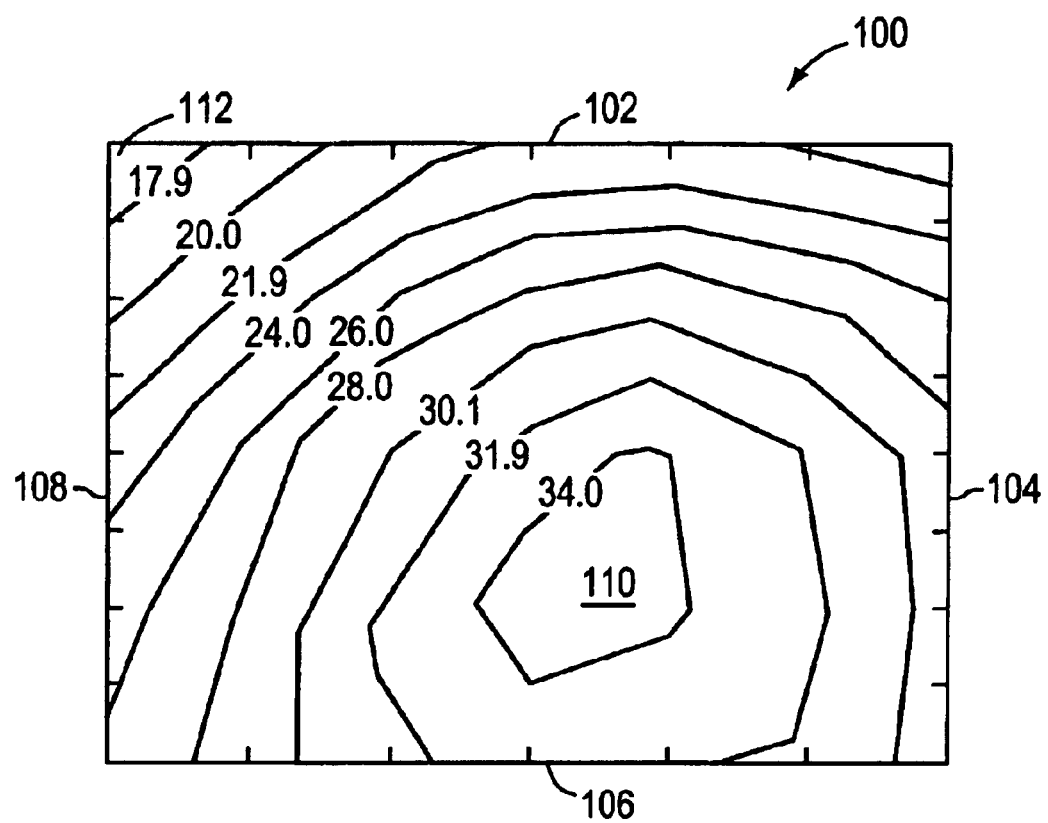
FIG. 1, previously discussed, is a highly schematic drawing of a projected image illustrating projector luminance non-uniformity.
Figure 3:
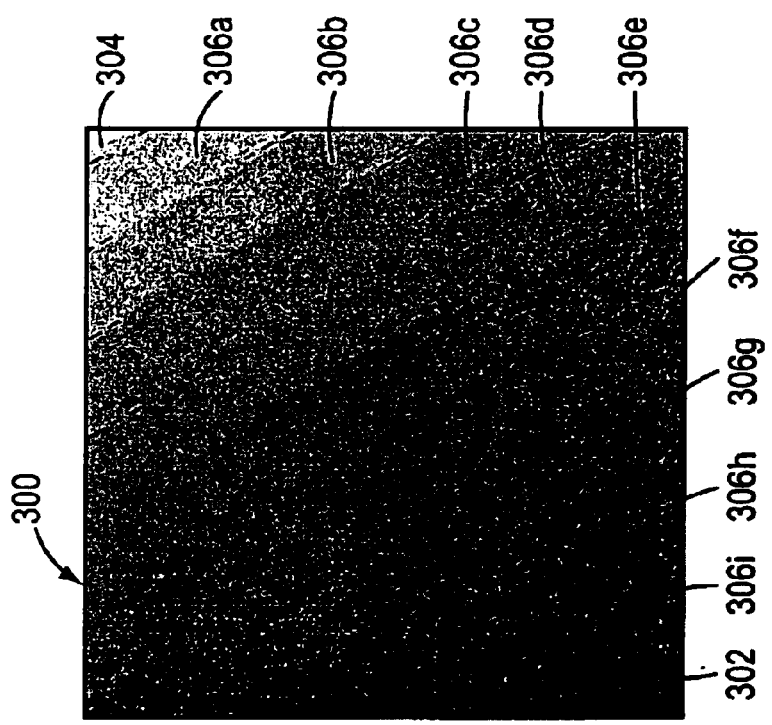
FIGS. 2 and 3, previously discussed, are highly schematic drawings of an input image and a projected illustrating false contours.
Figure 2:
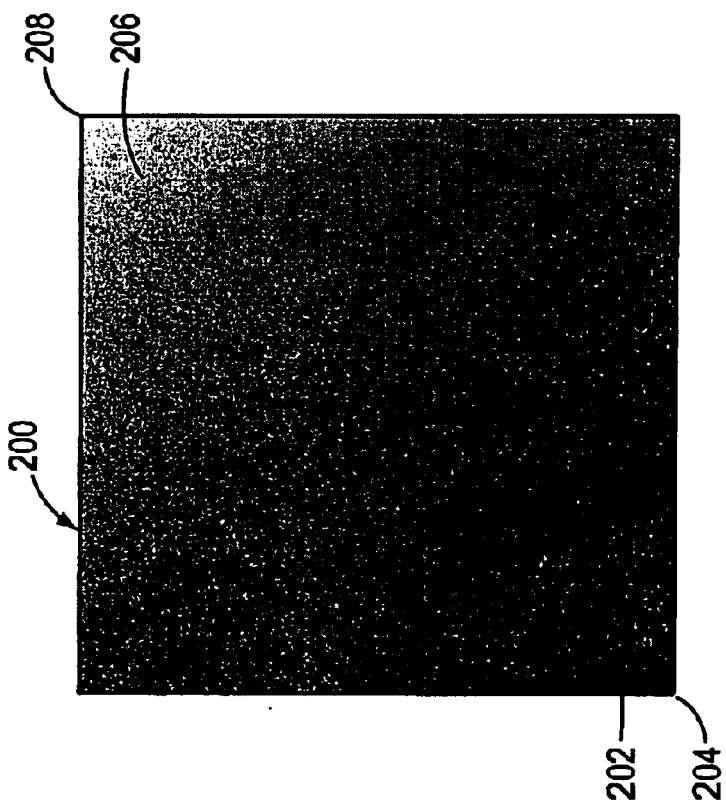

In addition, as described above, the actual number of levels that projector 400 can provide is something less than the number of stated levels. Thus, even though the projector 400 receives (or generates for display) image data having 256 levels, only some fewer number, e.g., 131, of truly unique levels can actually be produced by the projector 400. This limited or reduced set of levels can cause undesirable artifacts to appear in the projected image, such as false contours or banding as illustrated in FIG. 3. In accordance with the present invention, a technique is employed to provide the illusion that the projector 400 can actually produce the number of stated levels. In particular, engine 404 is further configured to perform dithering on the image information to create the illusion that projector 400 has more than 131 actual levels. Dithering is a technique of using an image device's available set of output levels in a judicious manner so that the resulting image has the appearance of having been formed from a greater number of output levels. The dithering performed by engine 404 of the present invention is spatial dithering that preserves the mean of the input. A suitable method for dithering an input image is described in U.S. Pat. No. 5,508,822 titled Imaging System with Multilevel Dithering Using Single Memory, filed Oct. 15, 1992 and issued Apr. 16, 1996, which is hereby incorporated by reference in its entirety.

As described herein, engine 404 supports dithering from any number of input levels, $N_i$, to any number of output levels, $N_o$, provided that $N_i \geq N_o$. $N_i$ and $N_o$, moreover, are not restricted to powers of two. Accordingly, the dithering performed by engine 404 can create the illusion that the projector 400 supports its stated number of levels, or a different number of levels, which may be even greater than the stated number. In the preferred embodiment, projector 400 receives image data having a predetermined number of "raw" input levels, $N_r$, to be displayed, such as 512 raw input levels.

Figure 11:
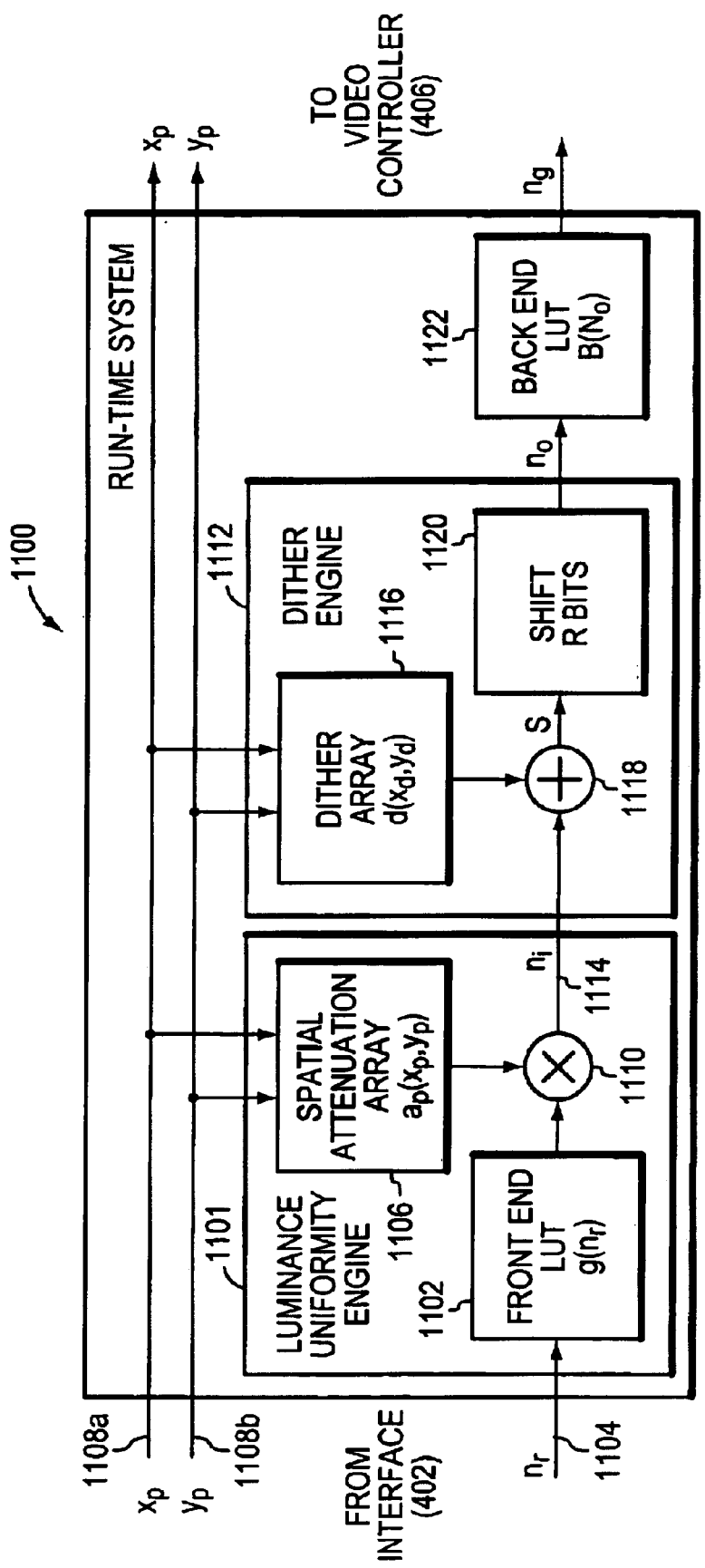
FIG. 11 is a highly schematic illustration of a preferred run-time system in accordance with the present invention.

FIG. 11 is a highly schematic illustration of engine 404 incorporating a run-time system 1100 configured and arranged in accordance with a preferred embodiment of the present invention. In general, the run-time system 1100 includes a luminance uniformity engine 1101, a dither engine 1112 and a back-end look-up table 1122 that cooperate to process input image information so that the resulting image generated by projector 400 is uniform in luminance and appears to have been produced from a greater number of levels than the number of unique levels that the projector 400 is capable of producing. The luminance uniformity engine 1101 includes a front end look-up table (LUT) 1102 that receives an uncorrected, raw input level, $n_r$, from interface 402 (FIG. 4), as indicated by arrow 1104, and a spatial attenuation array 1106 that receives the pixel addresses, in projector space, i.e., $x_p$, $y_p$, as indicated by arrows 1108a–b, corresponding to the respective raw, input level $n_r$, received at the front end LUT 1102. Luminance uniformity engine 1101 further includes multiplier logic 1110 that receives the outputs of the front end LUT 1102 and the spatial attenuation array 1106 for each input level/x,y coordinate pair. The multiplier logic 1110 multiplies those outputs together and the resulting "corrected" input level, $n_i$, is supplied to the dither engine 1112, as indicated by arrow 1114, along with the corresponding pixel address information.

The dither engine 1112 includes a dither array 1116, an addition logic circuit 1118, and a shift right (R) logic circuit or register 1120. The dither engine 1112 converts the corrected input level, $n_i$, to an output level $n_o$. Preferably, the number of output levels, $N_o$, produced by the dither engine 1112 equals the number of stated levels, $N_g$, for the projector 400. The output level, $n_o$, generated by the dither engine 1112 is passed to the back-end look-up table (LUT) 1122. The back end LUT 1122, which contains a mapping of stated projector levels to unique projector levels, converts the dithered output level, $n_o$, to a unique projector level, $n_g$, which is then provided to video controller 406 (FIG. 4).

To generate the spatial attenuation array 1106, the projector correction plane 1000 for each unique input level is normalized by dividing each correction value by the maximum value in each plane. For plane 1000 (FIG. 10), the maximum value is 125.0 at cell 10. Accordingly, each value within plane 10 is divided by 125.0, thereby normalizing the plane from 0 to 1.

Figure 12:
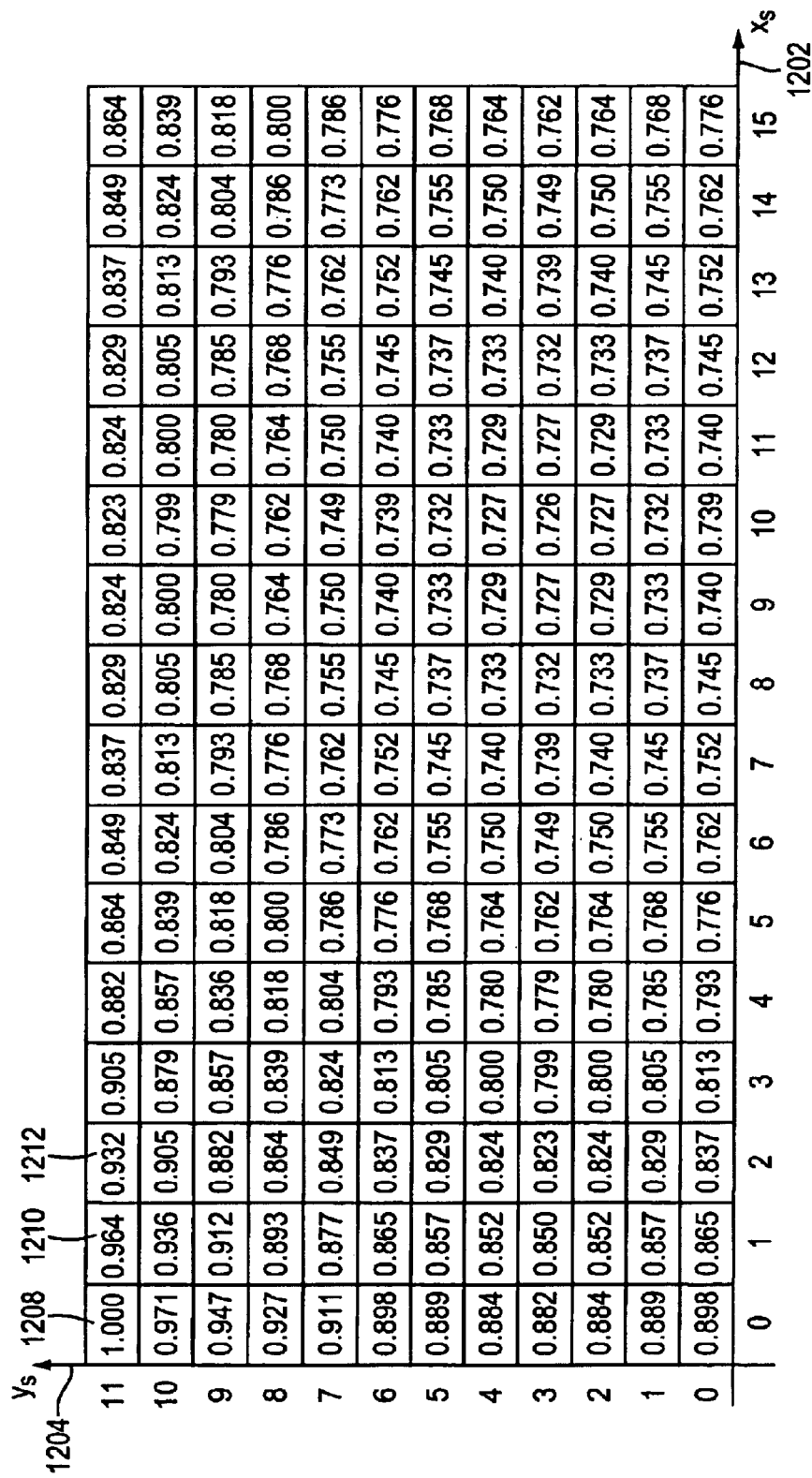

FIG. 12 a highly schematic illustration of a normalized correction plane 1200 for input level 125 corresponding to pruned, projector correction plane 1000. Normalized correction plane 1200 has an x-axis 1202 that is horizontally aligned and a y-axis 1204 that is vertically aligned. The x-coordinates range from 0–15, while the y-coordinates range from 0–11. The intersection of each pair of x,y coordinates defines a cell for storing information. Cell 1208, which corresponds to cell 1008 of projector correction plane 1000 at which the maximum value is located, is set to 125/125 or "1.000" as shown in FIG. 12. The values to be loaded into the remaining cells are similarly computed by dividing the matching value in projector correction plane 1000 by the maximum value, i.e., 125. Thus, cell 1210 is set to 120.4/125 or "0.964", cell 1212 is set to 116.5/125 or "0.932", and so on. Every projector correction plane 1000 is normalized in this manner so that all of the correction values range from 0 to 1 for each normalized projector correction plane. Next, a single 2-D plane is constructed from the entire set of unique, normalized projector correction planes by averaging the normalized values for every x,y pair from all pruned, normalized projector correction planes. In other words, the pruned, normalized projector correction planes 1200 may be logically stacked one on top of the other to form a 3-D array, and the values from each column of this array (which all have the same x,y coordinates) are added together and divided by the total number of unique correction planes in the 3-D array, e.g., 131. This process is repeated at every x,y pair to produce a single, 2-D spatial attenuation array. The equation for computing the spatial attenuation array is as follows:

$$a_P(x, y) = \underset{n_o}{avg}\left[\frac{p(x, y, n_o)}{\max_{(x,y)}[p(x, y, n_o)]}\right]$$

The front end LUT 1102 is preferably computed as follows. For each raw input level, e.g., $N_r$=0–511, the respective projector correction plane 1000 is divided by the spatial attenuation array. That is, the value stored at each cell of plane 1000 is divided by the value from the spatial attenuation array for that location. For example, consider cell 1008 of projector correction plane 1000 (FIG. 10) whose value is 125.0. Suppose the value of the spatial attenuation array for this location, i.e., x,y coordinates 0,11, is 0.9997. Then, 125.0 is divided by 0.9997 to give 125.0375. After dividing each projector correction plane 1000 by the spatial attenuation array, each resulting plane is averaged over x,y to produce a single value for that projector correction plane 1000. That is, all of the values of the current projector correction plane being evaluated, after being divided by the spatial attenuation array, are added together and divided by 16×12 or 192. The result for projector correction plane 1000, which corresponds to input level 125, for example, may be 120.4. This process is repeated for each projector correction plane 1000.

The equation for computing the front end LUT is as follows:

$$g(n_o) = \underset{(x,y)}{avg}\left[\frac{p(x, y, n_o)}{a_P(x, y)}\right]$$

In the preferred embodiment, an additional gain is rolled into the front end LUT 1102 to ensure that the dithering performed by the dither engine 1112 is mean preserving. This additional gain is given by the following equation:

$$\text{additional gain} = \frac{(N_i - 1)}{(N_r - 1)}$$

where,
$N_i$ is the number of input levels to the dither engine 912, and
$N_r$ is the number of raw input levels.

Each computed gain value is preferably multiplied by this additional gain and the result is loaded into the one-dimensional (1-D) front end LUT 1102. More specifically, after dividing the sum of values for the current projector correction plane by 192, the result is then multiplied by the additional gain factor described above, to generate the corresponding value for the front end LUT 1102, which maps each uncorrected, raw input level, i.e., $N_r$=0–511, to a single value.

The input level, $n_i$, which has been corrected for non-uniformity is then passed to the dither engine 1112. The dither engine 1112 basically converts the input level, $n_i$, to an output level, $n_o$, based on the dither pattern incorporated within dither array 1116. In particular, dither array 1116 is formed by normalizing and tiling or repeating a selected dither template to obtain the desired size of the dither array 1116. The dither template represents the pattern used to create the illusion of a greater number of levels than what is actually supported by the image device, in this case projector 400. The dither template is a grouping of elements arranged in a particular order. Those skilled in the art will understand that numerous dither templates have been proposed, any of which may be used. Nonetheless, the preferred dither template pattern is described in U.S. Pat. No. 5,535,020 titled Void and Cluster Apparatus and Method for Generating Dither Templates, filed Oct. 15, 1992 and issued Jul. 6, 1996, which is hereby incorporated by reference in its entirety, and has 1024 levels, i.e., the template is 32×32.

The selected dither template T(x', y') defines the order in which dither values are arranged within the dither array 916. The elements of the dither template have integer values between 0 and ($N_t$–1), where $N_t$ is the number of dither template levels. The input levels are compared to the elements of the dither template to determine the mapping of input levels to output levels. As shown, the dither engine 1112 receives a corrected input level, $n_i$, and its x,y coordinates (in projector space). The low order bits of the x,y coordinates are used to perform a look-up on the dither array 1116, which returns a corresponding dither value, e.g., $d(x_d,y_d)$, for those lower order x,y coordinates. The adder circuit 1118 adds the dither value to the input level, $n_i$, to produce a sum (S) that is passed to the shift right (R) circuit 1120. The shift R circuit 1120 quantizes the sum (S) by removing the least significant bits, i.e., the right most bits.

The dither array 1116 is preferably a normalized version of the dither template. The formula for normalizing the dither template so as to generate the dither array is as follows:

$$d[x_d, y_d] = int\left\{\Delta_d\left(T[x_d, y_d] + \frac{1}{2}\right)\right\}$$

where,
int{ } is integer truncation, and
$\Delta_d$ is the step size between normalized dither values, and it is given by:

$$\Delta_d = 2^R / N_t$$

where, R is the number of bits the shift R circuit 920 shifts to the right. It may be derived from the following equation:

$$R = int\left\{\log_2\left(\frac{2^b - 1}{N_o - 1}\right)\right\}$$

where b equals the number of bits in the sum (S) produced by the adder circuit 1118.

Here, $2^b$ is preferably asserted to be $2N_r$, because $N_r$ is a power of two. Furthermore, the number of input levels, $N_i$, to the dither engine 1112 is defined as follows:

$$N_i = (N_o - 1)2^R + 1$$

As described above, for the dither engine 1112 to be mean preserving an additional gain is imparted to the raw input level, $n_r$. This additional gain is given by:

$$(N_i - 1)/(N_r - 1)$$

Although this additional gain is preferably rolled into the front end LUT 1102, those skilled in the art will recognize that it may be accomplished at other points or locations, such as within the dither engine 1112 itself.

In operation, the run-time system 1100 receives a raw, uncorrected projector input level, e.g., 125, and a set of x,y coordinates, e.g., 3,11. Using the received, uncorrected input level, i.e., 125, a look-up is performed at the 1-D front end LUT 1102 producing a single output value, e.g., 120.4. The x,y coordinates map to a normalized attenuation value in the 2-D spatial attenuation array 806, e.g., 0.9877. These two values, 120.4 and 0.9877 are provided to the multiplier logic 1110 and multiplied together generating a corrected input projector level, i.e., 118.9, which is then provided to the dither engine 1116. The dither engine 1112 also receives the x,y coordinates for the corrected input level. Dither engine 1112 further includes address modifier logic (not shown) that converts the x,y coordinates, which are in projector space, to an address for accessing the corresponding value stored in the dither array 1116. This dither array value is then passed to the adder circuit 1118, which adds it to the corrected input level to produce the sum (S). The sum S is then shifted R bits to the right to produce the output level, $n_o$, of the dither engine 1112. The back-end LUT 1122, which contains a mapping of stated projector levels to unique projector levels, converts the output level, $n_o$, generated by the dither engine 1112 to its corresponding unique projector level, $n_g$. This unique projector level, $n_g$, is then provided to the video controller 406 (FIG. 4) along with the x,y coordinates, i.e., 3,11, for processing and ultimately for display by the projector 400.

In the illustrative embodiment, the shift R circuit 1120 is configured with the shift value and this value is fixed. Nonetheless, those skilled in the art will recognize that the shift value may be varied dynamically. For example, the dither engine 1116 may further include a system data generator (not shown) that computes the shift value to be utilized by the shift register, as described in U.S. Pat. No. 5,508,822.

In another embodiment, a quantizer look-up table (LUT) can be used in place of the shift register 1120, as described in U.S. Pat. No. 5,508,822.

In the illustrative embodiment, the spatial attenuation array 1106 and front end LUT 1102 are computed in subsampled space, e.g., with 12×16 arrays, and then interpolated, e.g., using bilinear interpolation, to the full projector resolution, e.g., 1280 by 768. The spatial attenuation array 1106 represents the shape of luminance variation, also referred to as the distortion, across the projector plane. The front end LUT 1102, on the other hand, represents the gain or amplitude of the distortion.

It will be understood to those skilled in the art that the run-time system 1100, including each of its sub-components, may be implemented in hardware through registers and logic circuits formed from Application Specific Integrated Circuits (ASICs) or Field Programmable Gate Arrays (FPGAs), among other hardware fabrication techniques. Alternatively, run-time system 1100 may be implemented through one or more software modules or libraries containing program instructions pertaining to the methods described herein and executable by one or more processing elements (not shown) of projector 400. Other computer readable media may also be used to store and execute these program instructions. Nonetheless, those skilled in the art will recognize that various combinations of software and hardware, including firmware, may be utilized to implement the present invention.

It should be understood that, as the size of even the subsampled camera capture array 700 (FIG. 7) can be large, it may be further subsampled by factors of two in one or both directions. For every halving in size along a given dimension, one less bit of pixel address information is need to uniquely address the cells of the array. This has the effect of approximating the attenuation as constant in blocks of size $2^m$ by $2^n$, where m and n are the subsample rates in the x and y dimensions. Those skilled in the art will recognize that other and/or additional optimizations may be performed.

For projectors having a single LCD panel through which light is passed, the non-uniformity in luminance is the same in all three color planes, e.g., red, green and blue. Thus, a separate but identical run-time system 1100 is preferably built for each color, e.g., red, green and blue. For projectors having multiple LCD panels, the non-uniformity in luminance may vary by panel. In this case, a separate camera capture array is built for each color, e.g., red, green and blue, and separate projector correction LUTs and separate run-time systems having different correction values are similarly developed. In addition, as is known in the art, the dither array corresponding to each color is slightly different to avoid interference, which can cause undesirable visual artifacts to appear in the projected image.

It should be understood that the present invention is especially suited for a projector that has a built in video camera, such as the TLP-261U Projector from Toshiba.

In an alternative embodiment, the run-time system 900 may simply include a dither engine for increasing the projector's apparent amplitude resolution. That is, the luminance uniformity engine is omitted in this embodiment.

The foregoing description has been directed to specific embodiments of the present invention. It will be apparent, however, that other variations and modifications may be made to the described embodiments, with the attainment of some or all of their advantages. For example, projector correction arrays may be generated for only some as opposed to all of the input levels of the subject projector. Therefore, it is the object of the appended claims to cover all such variations and modifications as come within the true spirit and scope of the invention.

What is claimed is:

1. A system for modifying input image data used by a projector in generating a displayed image, the projector supporting number of unique levels, the system comprising:

a luminance uniformity engine configured to process the input image data, based on spatial location of pixels forming said input image data, so as to generate corrected image data that is uniform in luminance;

a dither engine configured to process the corrected image data from the luminance uniformity engine so as to generate dithered image data; and a converter configured to convert the dithered image data into the unique levels of the projector.

2. The system of claim 1 wherein the luminance uniformity engine comprises:

a front-end look-up table (LUT) that imposes a gain on the input level to produce a resulting input level;

a spatial attenuation array configured with a plurality of distortion correction values; and a multiplier circuit for multiplying the resulting input level from the front-end LUT by a selected distortion correction value from the spatial attenuation array to produce a luminance corrected input level.

3. The system of claim 2 wherein the input image data includes a level and x,y coordinates for each level, and the distortion correction values of the spatial attenuation array are indexed by the x,y coordinates of the input image data.

4. The system of claim 3 wherein the input image data includes a level and x,y coordinates for each level, and the dither values are indexed by the x,y coordinates of the levels of the input image data.

5. The system of claim 1 wherein the dither engine comprises:

a dither array configured with a plurality of dither values;

an adder circuit configured to generate a sum by adding a selected dither value to the luminance corrected input level; and a shift register configured the shift the sum by a selected number of bits, thereby producing a dithered output level.

6. The system of claim 4 wherein the dither engine has a number of input levels and a number of output levels, and the number of output levels of the dither engine is one of equal to and greater than the number of stated levels of the projector.

7. The system of claim 5 wherein the converter is a back-end look-up table (LUT) that is configured to map dither output levels to unique projector levels.

8. A method for correcting projector non-uniformity and increasing apparent amplitude resolution, the projector supporting a stated number of levels, the method comprising the steps of:

measuring the projector non-uniformity at a plurality of the stated levels;

determining the number of unique levels supported by the projector;

utilizing the non-uniformity measurements to generate uniform projector image data; and dithering the modified projector image data such that a displayed image appears to have been formed either from the stated number of levels or from a greater number of levels than the stated number.

9. The method of claim 8 wherein the step of determining the number of unique projector levels comprises the steps of:

generating a displayed image from the projector for each of the plurality of stated projector levels;

capturing each of the displayed images with a camera, each camera captured image having a plurality of pixel values;

averaging all of the pixel values for each camera captured image; and comparing the averaged pixel values computed for two adjacent stated projector levels to determine whether the two stated projector levels are unique.

10. The method of claim 9 wherein the step of comparing the averaged pixel values comprises the steps of:

computing the difference between the averaged pixel values for the two adjacent stated projector levels;

finding the two adjacent stated projector levels to be unique provided that the computed difference is greater than a threshold times the difference between a maximum averaged pixel value considering all of the plurality of stated levels and a minimum averaged pixel value considering all of the plurality of stated levels; and finding the two adjacent stated projector levels to be redundant provided that the computed difference is less than a threshold times the difference between the maximum averaged pixel value and the minimum averaged pixel value.

11. The method of claim 10 wherein the threshold is on the order of 0.001.

12. The method of claim 8 wherein the uniform projector image data has a plurality of corrected levels, and the step of dithering the uniform projector image data comprises the step of utilizing a selected dither template pattern to convert the corrected levels of the uniform image data to corresponding dither output levels.

13. The method of claim 8 further comprising the step of mapping each dither output level to a respective unique output level supported by the projector.

14. The method of claim 13 wherein the selected dither template pattern is a void and cluster pattern.

* * * * *